(12) United States Patent
Vassigh

(10) Patent No.: US 10,349,131 B2
(45) Date of Patent: Jul. 9, 2019

(54) TIMER-BASED CONTROL OF AUDIOVISUAL OUTPUT DEVICES

(71) Applicant: Roku, Inc., Los Gatos, CA (US)

(72) Inventor: Ali Vassigh, San Jose, CA (US)

(73) Assignee: Roku, Inc., Los Gatos, CA (US)

( * ) Notice: Subject to any disclaimer, the term of this patent is extended or adjusted under 35 U.S.C. 154(b) by 0 days.

(21) Appl. No.: 15/631,508

(22) Filed: Jun. 23, 2017

(65) Prior Publication Data

US 2017/0289618 A1 Oct. 5, 2017

Related U.S. Application Data

(63) Continuation of application No. 14/582,120, filed on Dec. 23, 2014, now Pat. No. 9,693,003.

(60) Provisional application No. 61/923,600, filed on Jan. 3, 2014.

(51) Int. Cl.
| | |
|---|---|
| *H04N 21/443* | (2011.01) |
| *H04N 21/485* | (2011.01) |
| *H04N 5/60* | (2006.01) |
| *H04N 5/57* | (2006.01) |
| *H04N 5/63* | (2006.01) |
| *H04N 5/44* | (2011.01) |
| *H04N 21/433* | (2011.01) |
| *H04N 21/8355* | (2011.01) |

(52) U.S. Cl.
CPC ........... *H04N 21/4436* (2013.01); *H04N 5/44* (2013.01); *H04N 5/57* (2013.01); *H04N 5/60* (2013.01); *H04N 5/63* (2013.01); *H04N 21/4333* (2013.01); *H04N 21/485* (2013.01); *H04N 21/4852* (2013.01); *H04N 21/4854* (2013.01); *H04N 21/8355* (2013.01)

(58) Field of Classification Search
CPC .... H04N 21/485; H04N 21/4436; H04N 5/44; H04N 5/57; H04N 5/60; H04N 5/63; H04N 21/4333; H04N 21/4852; H04N 21/4854; H04N 21/8355
See application file for complete search history.

(56) References Cited

U.S. PATENT DOCUMENTS

| | | | | |
|---|---|---|---|---|
| 5,386,247 | A  * | 1/1995 | Shafer | ................ H04N 5/44513 348/563 |
| 9,693,003 | B1 | 6/2017 | Vassigh | |
| 2010/0107184 | A1* | 4/2010 | Shintani | ........... H04N 21/42201 725/10 |
| 2013/0142181 | A1* | 6/2013 | Makim | ............... H04L 12/2818 370/338 |
| 2013/0148020 | A1* | 6/2013 | Cook | ................. H05B 37/0272 348/460 |

* cited by examiner

*Primary Examiner* — Hunter B Lonsberry
(74) *Attorney, Agent, or Firm* — Sterne, Kessler, Goldstein & Fox P.L.L.C.

(57) ABSTRACT

A system includes a processor to initiate a timer in response to an action-execution command. The processor identifies expiration of the timer. In response to expiration of the timer, the processor transmits one or more commands to one or more controllable output devices to simultaneously ramp down the sound volume and gradually dim the display brightness generated by said one or more controllable audiovisual output devices over a predetermined ramp-down period of time.

21 Claims, 6 Drawing Sheets

TIMER-BASED CONTROL OF AUDIOVISUAL OUTPUT DEVICES

CROSS-REFERENCE TO RELATED APPLICATIONS

This application is a continuation of U.S. patent application Ser. No. 14/582,120, filed Dec. 23, 2014, now U.S. Pat. No. 9,693,003, which claims the benefit of U.S. Provisional Patent Application Ser. No. 61/923,600, filed on Jan. 3, 2014, the contents of all of which are herein incorporated by reference in their entireties.

FIELD OF INVENTION

The present technology relates to timers for use with multimedia and/or audiovisual devices such as television sets, and in certain embodiments is more specifically directed to various implementations and applications associated with audiovisual device shut-off timers (e.g., television sleep timers) within an interactive networked environment.

BACKGROUND

Consumers have an increasing amount of on-demand media content available to them. For example, on-demand media content includes visual content (e.g., movies, television shows, still images), audio content (e.g., music), and software applications (e.g., games).

Along with an increasing amount of available on-demand content, consumers desire an easy way to access their streaming media content. For example, consumers desire improvements relating to the ways in which they interact with their multimedia audiovisual devices such as television sets to initiate timers, as well as relating to the ways that such timers control such devices.

Various existing technologies are known for implementing a "sleep timer" or "shut-off timer" in the context of television sets. Typically, a certain time of day or night (e.g., 11:30 p.m.) may be input or otherwise communicated to a device (e.g., a television set) by a user to determine the point in time at which the timer will execute a specific action (e.g., turn the television set off). Alternatively, it is also known that a relative length of time (e.g., two hours after the current time) may be specified as the timer action-execution point instead of an absolute time of day. One commonly known use for such a timer is to set it at night, as a user is getting ready to go to sleep, with the intention that the user may fall asleep before the timer action-execution point in time is reached, and then when that time is reached the timer will turn off the television set at the specified time, thereby conserving power and reducing the audiovisual stimulus to which the user is exposed during sleep, among other potential benefits.

Various disadvantages are associated with existing implementations. For example, abrupt changes in sound volume and/or brightness intensity at the time action-execution point (even if transitioning to silence and/or darkness) may sometimes be disturbing to certain users, such that they may awaken. Such a result is clearly the opposite of the user's intention in many cases. In other instances, a user may actually still be awake (although potentially temporarily distracted) at the time that the timer causes the device to turn off or become deactivated in some way, and returning the relevant devices to their previous operational state may be cumbersome and/or annoying to the user at that point. Such disadvantages or limitations may be exacerbated in relatively complex hardware environments, such as those in which a television set is connected to separate sound amplifiers and/or speakers, and potentially to other devices such as projectors, audiovisual receivers, DVD players, DVRs (Digital Video Recorders), game consoles, cable or satellite receivers, content streaming devices, and the like.

BRIEF DESCRIPTION OF THE DRAWINGS

The following figures depict various embodiments for illustrative purposes. From the figures and corresponding description, different embodiments may be employed without departing from the invention as described herein.

Like reference numerals refer to corresponding parts throughout the several views of the drawings.

DETAILED DESCRIPTION

Figure 1:
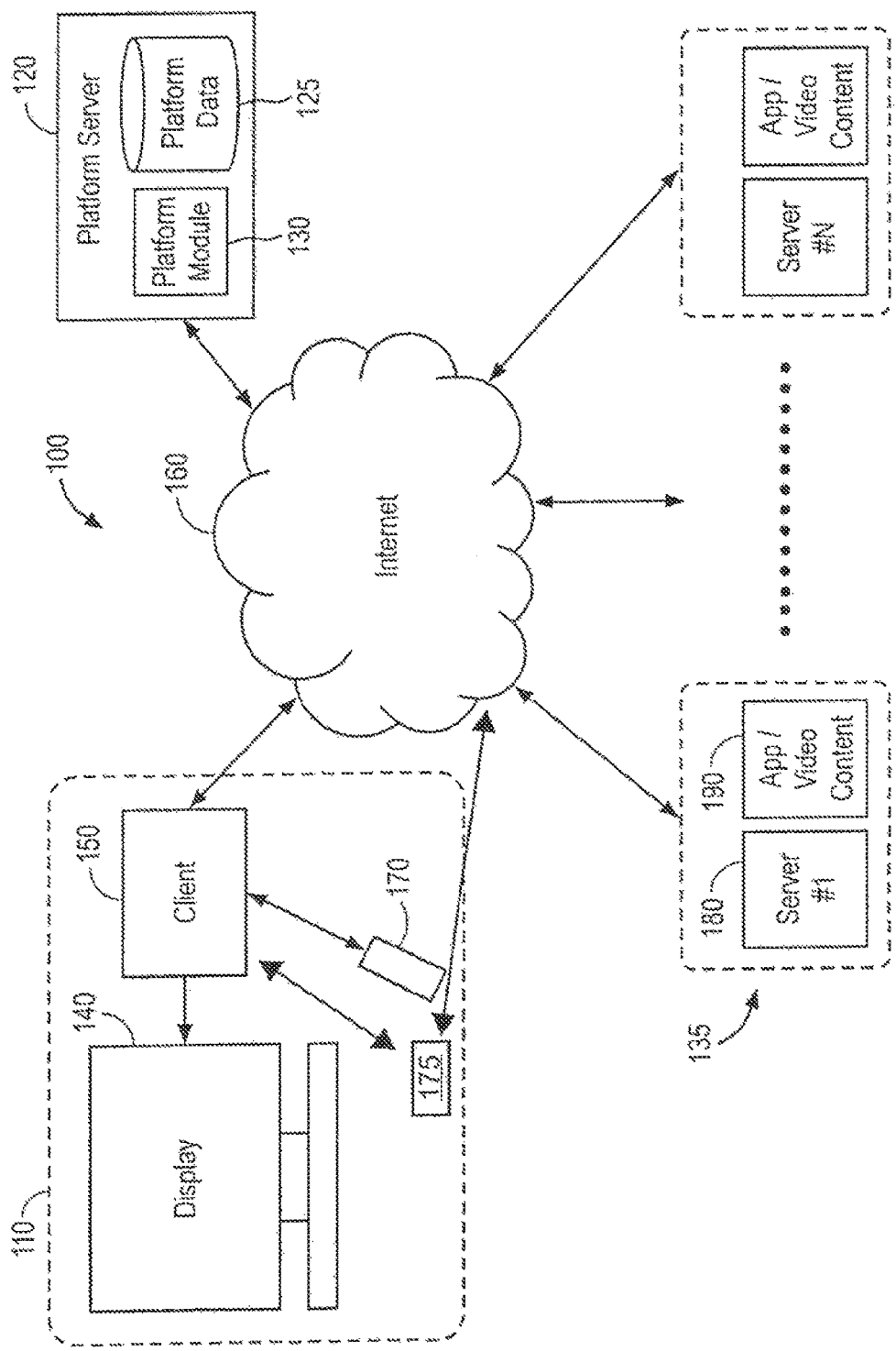
FIG. 1 illustrates an exemplary networked streaming environment according to an embodiment of the present invention.

Those of ordinary skill in the art will realize that the following description of the present invention is illustrative only and not in any way limiting. Other embodiments of the invention will readily suggest themselves to such skilled persons, having the benefit of this disclosure, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Reference will now be made in detail to specific implementations of the present invention as illustrated in the accompanying drawings. The same reference numbers will be used throughout the drawings and the following description to refer to the same or like parts.

The data structures and code described in this detailed description are typically stored on a computer-readable or machine-readable storage medium, which may be any device or medium that can store code and/or data for use by a computer system. The terms "computer-readable" and "machine-readable medium" should be understood to include any structure that participates in providing data which may be read by an element of a computer system. Such a medium may take many forms, including but not limited to, non-volatile media and volatile media. Non-volatile media include, for example, optical or magnetic disks and other persistent memory. Volatile media include dynamic random access memory (DRAM) and/or static random access memory (SRAM).

Certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C# (CSharp), JAVA®, Perl, Ada, Python, Pascal, SmallTalk, FORTRAN, assembly language, and the like, may be used to implement aspects of the present invention. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of functions.

FIG. 1 illustrates a block diagram according to one embodiment of a streaming environment 100 according to aspects of the present invention. In particular, the exemplary streaming environment 100 shown in FIG. 1 includes an interface system 110, a platform server 120, and one or more sources of content programming 135. In one embodiment, the interface system 110 includes a display device 140 (e.g., monitor or television set), a client device 150 (e.g., multimedia content streaming player), and a user input device 170 (e.g., remote control unit). The client device 150 is configured to communicate with the display device 140 and a network 160. Depending on the requirements of each particular implementation, the client device 150 may be a separate unit or device with respect to display device 140, or it may be partially or wholly incorporated (physically and/or logically) into display device 140.

Network 160 may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, and/or another type of suitable network, depending on the requirements of each particular implementation.

In one embodiment, the platform server 120 includes a database 125 and a platform module 130. The database 125 is configured to store data such as programming software packages. The data within these programming software packages may include: the network locations and content descriptions of content sources 135, hardware/software capabilities of different firmware versions and specifications of the client device 150, customer data associated with each client device 150, and user interface information associated with the client device 150.

In one embodiment, the customer data includes customer-specific information such as demographic data, geographic data, ISP identification, and financial information. In one embodiment, the platform server 120 generates customized user interfaces for each of the client devices 150. In one embodiment, the user interface from the platform server 120 provides a selection of content such as audio, visual, and gaming content to the client device 150. In this example, the platform server 120 is configured to supply a graphical representation of the selection content to the client device 150 and further allows the client device 150 to select and access individual content from the selected content from the content source 135 through this graphical representation of the selection content.

In one embodiment, the platform server 120 is configured to receive input from client device 150 and processes the input through the platform module 130. The input from the client device 150 includes navigation and selection commands which may represent selection of content, search for content, error reporting, and ongoing interaction with an application running on the platform server 120.

In one embodiment, the client device 150 displays content on display device 140. In one embodiment, the content displayed on the display device 140 is sourced from one of the client device 150, the platform server 120, and the content source 135. In one embodiment, the input device 170 transmits signals to the client device 150. In one embodiment, the input device 170 utilizes one of or a combination of: an infrared signal, a radio frequency signal, and a Bluetooth signal to communicate with the client device 150.

The input device 170 is configured to enter data and to make user selections from the interface as presented through the client device 150. In one embodiment, the interface displayed by the client device 150 may be from the platform server 120, from the content sources 135, or be locally generated by the client device 150. In one embodiment, the input device 170 also includes a display to show additional content. In another embodiment, the input device 170 includes a touch screen which allows content to be displayed and input to be received. Exemplary input devices 170 include remote controls, smart phones, tablets, and mobile computers.

In one embodiment, the content sources 135 include a server 180 and a storage device with content 190. In one embodiment, the network address of particular content stored within the storage device 190 is maintained within the platform server 120. In another embodiment, the general location of the content source 135 is maintained and stored within the platform server 120 while the specific locations of corresponding content are managed locally by the content source 135. In yet another embodiment, the location of the content source 135 is embedded within the graphical representation displayed through the client device 150 such that interaction with the graphical representation through the client device 150 allows the content located within the content source 135 to be accessible to the client device 150.

In one embodiment, the content stored within the storage device 190 includes music, video, still pictures, text, graphics, gaming applications, and the like. In one embodiment, the particular content which is stored within the storage device 190 is provided to the client device 150 through the network 160.

In one embodiment, the client device 150 makes a request for specific content. If the requested content is video content, the storage device 190 transmits video data that represents the specific video content to the client device 150 through the content source 135. In one embodiment, platform server 120 supports interfaces, such as login interfaces, search interfaces, and customized interfaces for the client device 150.

Figure 2:
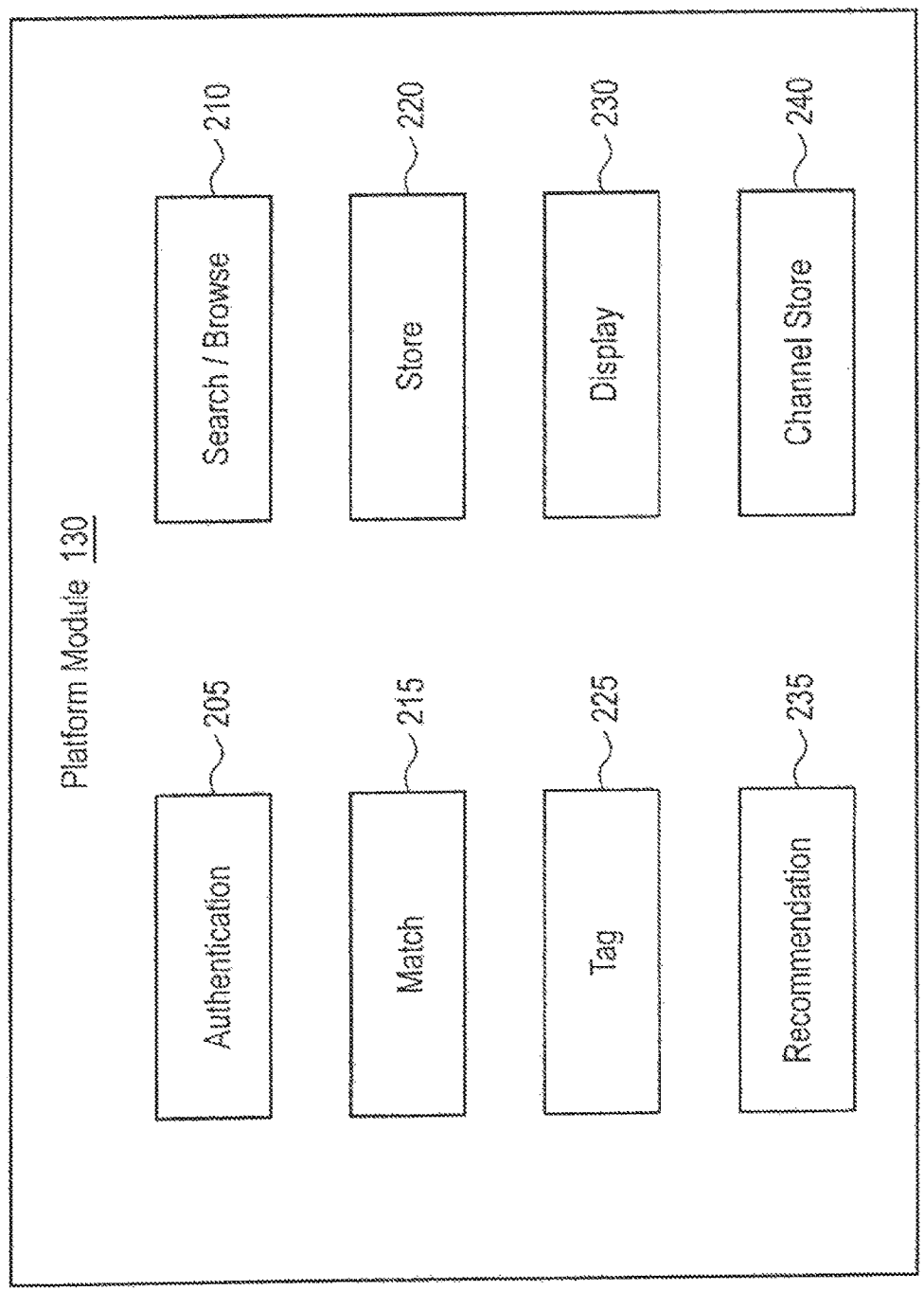
FIG. 2 depicts a representative platform module, as shown in FIG. 1, according to one embodiment of the present invention.

FIG. 2 illustrates a representative platform module 130 as shown in FIG. 1, according to aspects of the present invention. In one embodiment, the platform module 130 includes an authentication module 205, a search/browse module 210, a messaging module 215, a store module 220, an error reporting module 225, and a display module 230.

The authentication module 205 interacts with the client device 150 and authenticates a profile or user account associated with the particular client device 150. For example, the profile includes data associated with a user such as the user name, password, device associations, IP addresses, location, email address, payment information, and content subscriptions. In one embodiment, the authentication module 205 recognizes and authenticates the client device associated with a particular user account through password authentication, location authentication, visual authentication, or audio authentication. The authentication can be configured to occur when setting up a new client device 150, purchasing content or subscriptions, or periodically as needed.

The search/browse module 210 is configured to detect input from a client device 150 and/or the input device 170. In one embodiment, the input represents the selection of a channel, content, or application. In another embodiment, the input represents a textual, visual, or audible search for content, a channel, or application. In yet another embodiment, the input represents browsing content, channels, or applications.

The message module 215 coordinates messaging activities such as sending messages related to the error reporting module 225. In one embodiment, these messages are sent to a client device 150, to a mobile phone, to an email account, or to a voicemail.

The store module 220 coordinates the storage of data within the platform server 120. The data coordinated by the store module 220 includes content listings and corresponding descriptions, user profiles, error reporting, searching and browsing requests, content viewed, channels and applications utilized, and tags, and friends. Depending on the nature of the data, access to the content is controlled to prevent unauthorized use.

The error reporting module 225 coordinates the creation and use of error tags associated with content, channels, and applications. Error tags can be assigned to channels and applications by users through the client device 150. Error tags can also be assigned to portions of audio and video streams by the user of the audio and video streams through the client device 150. The error tags may describe a problem with viewing or using the corresponding content. Representative problems include poor video or audio quality, disruption of streaming video or audio, inability to initiate content, and the like.

The display module 230 coordinates display of representative content and user interfaces from the platform server 120 to each of the client devices 150. Examples of representative content include listings and descriptions of channels, error messaging, content, and applications. Further, the user interface is configured to allow searching, browsing and selection for channels, content, and applications.

Figure 3:
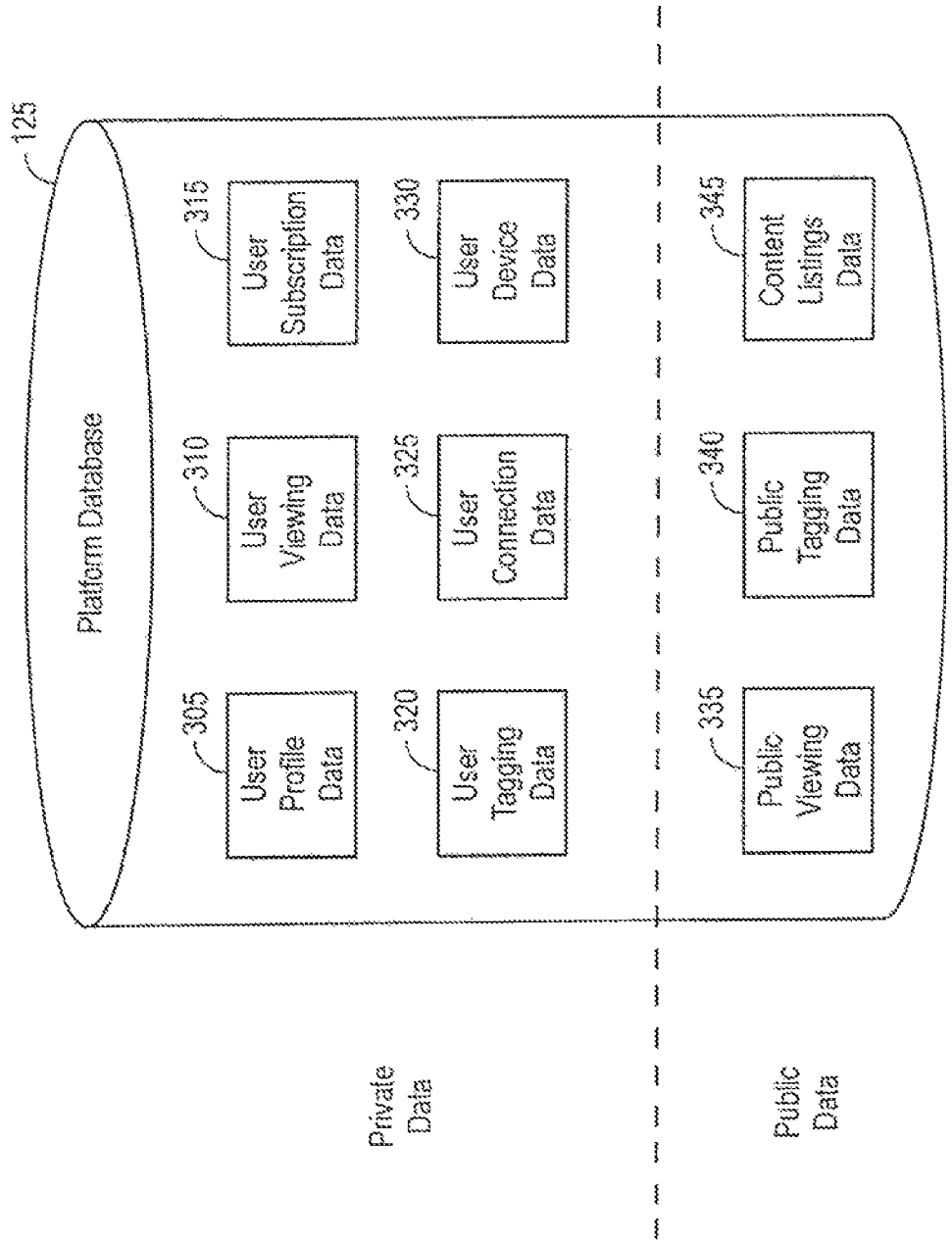
FIG. 3 illustrates a representative platform database, as shown in FIG. 1, according to one embodiment of the present invention.

FIG. 3 illustrates a representative platform database 125 as shown in FIG. 1, according to aspects of the present invention. In one embodiment, the platform database 125 includes private data and public data. The private data contains information which is identifiable with a particular user; the public data contains information that is aggregated and not identifiable with a particular user. The private data within the platform database 125 includes user profile data 305, user viewing data 310, user subscription data 315, user error data 320, user connection data 325, and user device data 330. The public data within the platform database 125 includes public viewing data 335, public error data 340, and content listing data 345.

In one embodiment, utilization of the private data is restricted to access within the platform server 120 and access by the particular user corresponding to the private data. Utilization of the public data can be accessed by all users and selected third parties.

The user profile data 305 includes information such as a user's name, address, credit card/payment information, age, and gender. The user viewing data 310 includes the channels, audio content, visual content, video content, and applications utilized through a client device 150. In one embodiment, the user viewing data 310 allows a client device 150 that is associated with the particular user to view recently watched channels and content as well as determine which applications were recently used. Further, the user viewing data 310 also includes stored searches that are performed through devices associated with this user account. In one embodiment, the stored searches are initiated by explicitly searching for content through a text based, image based, or voice based search. In another embodiment, the stored searches are implicitly identified by recording browsing choices.

The user subscription data 315 includes information such as channels subscribed by a particular user and content and applications purchased by the particular user. The user error data 320 includes error information related to a particular channel, application or content experienced through a client device 150. For example, the error information can include a user's comment or description of the error pertaining to a channel, application or content. Further, the error information can also describe the location of the error within the channel, content or application. In one embodiment, the entire content is tagged with a description as determined by the particular user. In addition, any further action regarding the error such as further notification upon correction of the error can also be noted within the user error data 320.

The user connection data 325 includes a listing of other users that are associated with the particular user as a friend. In one embodiment, having users connected to each other as friends allows a particular user to share recently watched content, channel subscriptions, user tags, and applications with other connected users. The user device data 330 includes a listing of devices associated with the particular user. The device includes a client device 150, an input device 170, a mobile device such as a tablet, laptop computer, or smart phone.

The public viewing data 335 includes a listing of channels, content, and applications utilized by many users. In one embodiment, the popularity of the content is ranked based on the number of viewers and the order in which the content is viewed. For example, the higher number of views per day for content would indicate higher popularity. Further, when multiple content entities are presented next to each other, the content entity which is selected first for viewing is given a higher popularity rating.

The public error data 340 includes error information related to a particular channel, content or application reported by many users and/or content providers. In one embodiment, the error information within the public error data 340 comes from content providers when they know of an error. Further, the error information within the public error data 340 comes from users when they encounter an error.

The content listings data 345 includes listings of content and descriptions of the corresponding content. In one embodiment, the descriptions include key word tagging throughout the content, a summary description of the content, directors and actors associated with the content, and third party reviews associated with the content.

Figure 4:
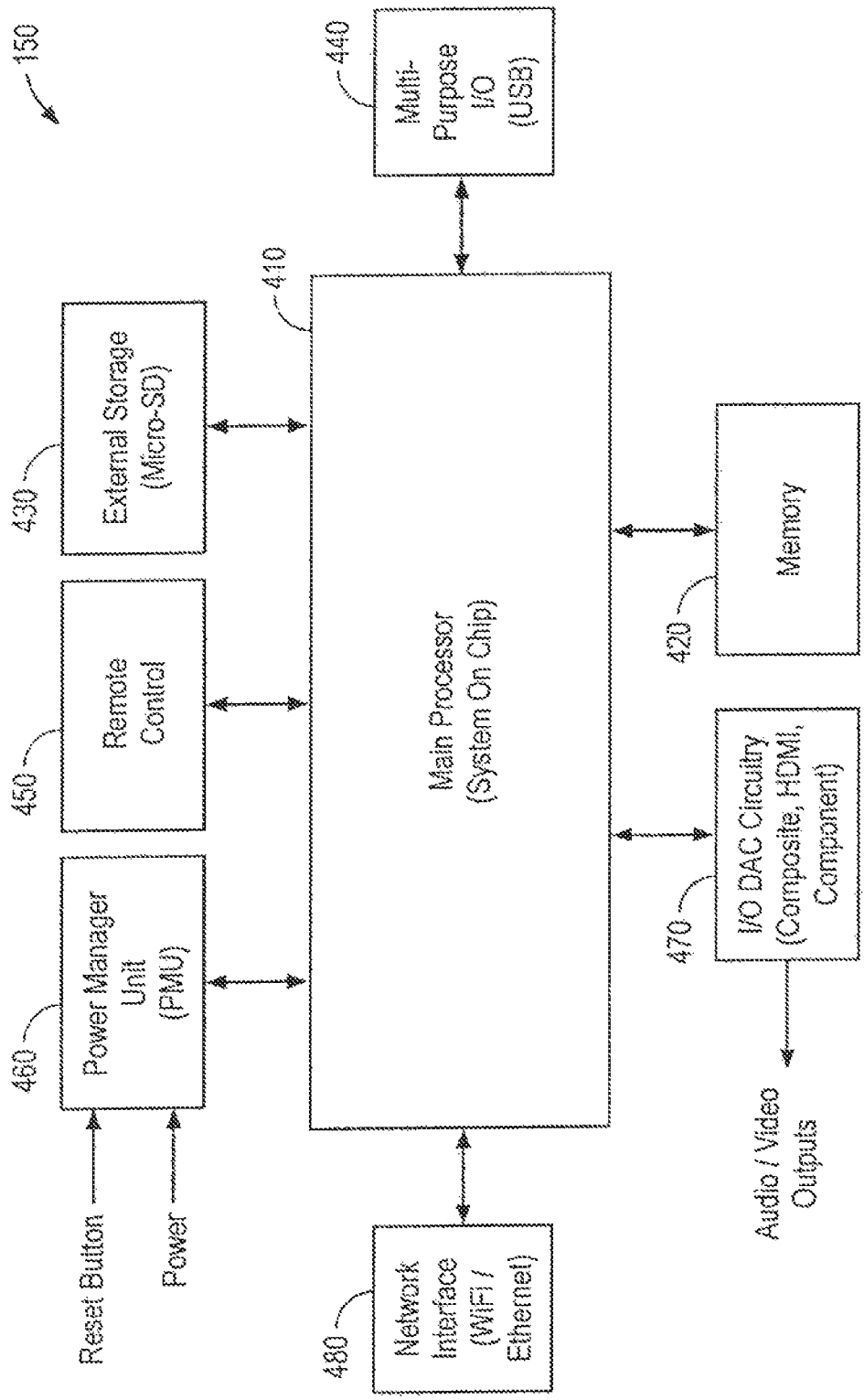
FIG. 4 depicts a block diagram of a representative client, as shown in FIG. 1, and its relevant components according to aspects of the present invention.

FIG. 4 illustrates a block diagram of a representative client device 150 as shown in FIG. 1. In one embodiment, the client device 150 is configured such that content may be streamed into the client device 150. The content streamed into the client device 150 includes audio content, visual content, and applications. In one embodiment, the client device 150 is utilized to transmit instructions and selection to the content server 135 and/or the platform server 120.

In one embodiment, the client device includes a processor 410, internal memory 420, external storage 430, multipurpose I/O port 440, input device interface 450, power management 460, audio/visual I/O interface 470, and network interface 480. In one embodiment, the processor 410 utilizes a central processing unit (CPU). In another embodiment, the processor 410 also utilizes a graphics processing unit (GPU) which may be integrated with the CPU or be configured to be physically separate. In one embodiment, the internal memory 420 includes one of or a combination of random access memory (RAM), flash memory, and read only memory (ROM). Additional memory and memory interfaces such as the multi-purpose I/O port 440 may be provided in various embodiments, to support memories such as the external storage 430 which can include hard disks, Universal Serial Bus (USB) drives, Secure Digital (SD) cards, and the like. These memories may also be used for storage of applications, programs, buffered media, media, executable computer code, and software keys.

In one embodiment, the input device interface 450 enables an input device to interface with the client device 150. In one embodiment, the input device interface 450 is configured to communicate with the input device through a wireless interface such as Bluetooth (BT), radio frequency (RF), and infrared (IR). In one embodiment, the input device interface 450 supports the functionality through an input device including any combination of virtual buttons embodied on a customization screen, physical buttons, accelerometer, gyroscope, pressure sensor, tilt sensor, magnetic sensor, microphone, and/or light sensor.

In one embodiment, the I/O interface 470 supports multiple video output options such as High Definition Multimedia Interface (HDMI), Red-Green-Blue (RGB) component video, Separate Video (S-video), Digital Visual Interface (DVI), Video Graphics Array (VGA), Mobile High-Definition Link (MHL), and composite video. In one embodiment, USB and Apple® Thunderbolt®-enabled displays are also supported.

In one embodiment, the network interface 480 supports multiple network interfaces such as Ethernet, Wi-Fi, and Bluetooth. In another embodiment, the network interface 480 also supports coaxial, digital TV antenna, and satellite television.

Figure 5:
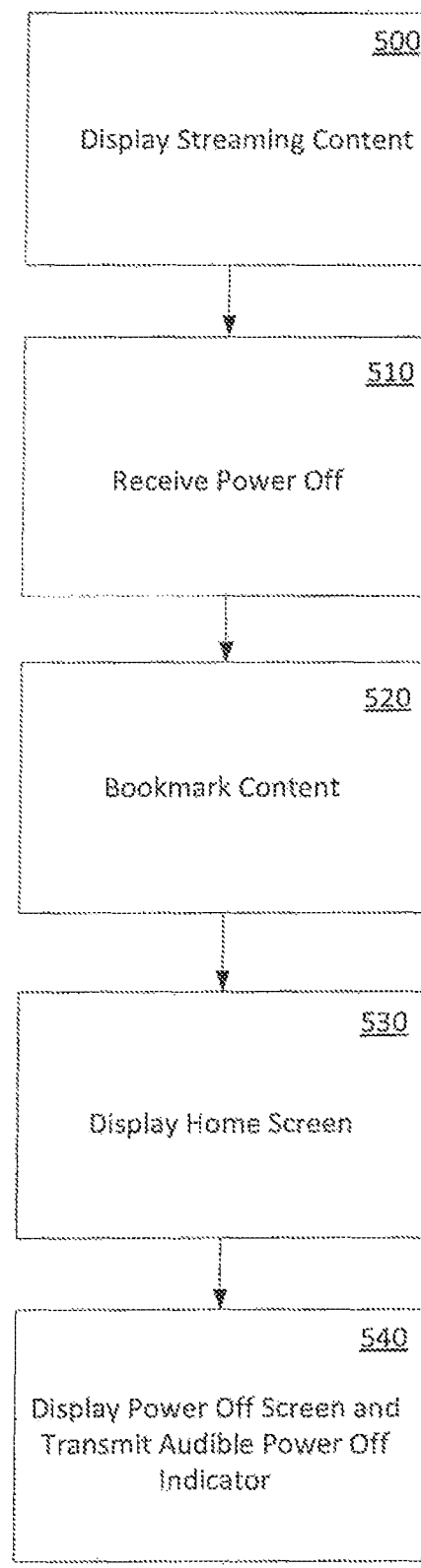
FIGS. 5 and 6 illustrate exemplary flow charts according to certain aspects of the present invention.
Figure 6:
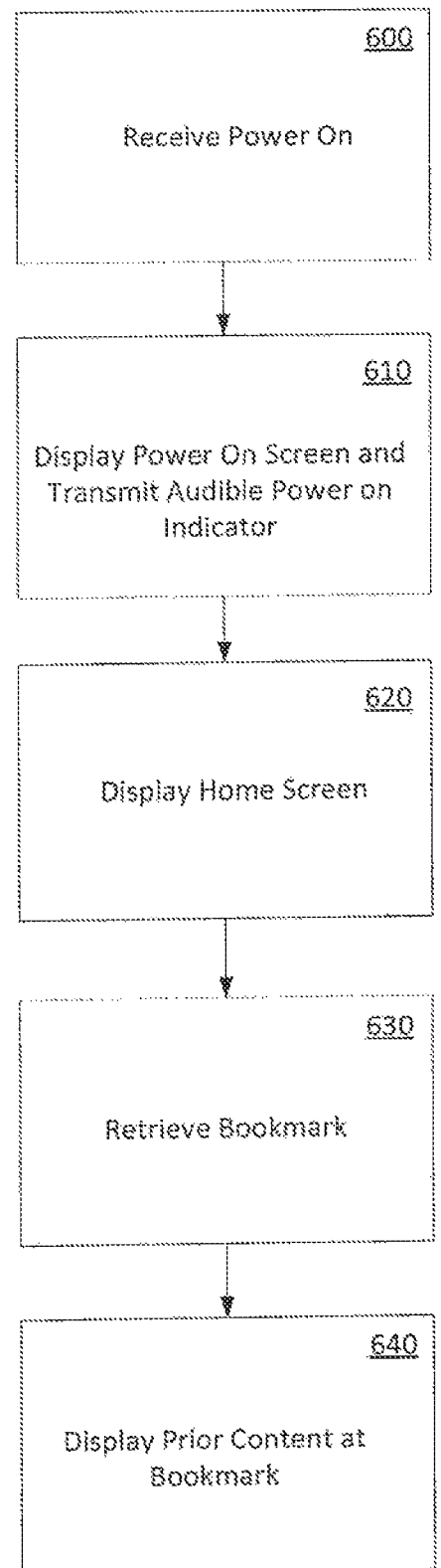

FIGS. 5 and 6 illustrate flow diagrams showing exemplary embodiments for use with the display device 140, the input device 170, the streaming environment 110 and the platform server 120 as shown in FIG. 1. The blocks within the flow diagrams are shown only for illustrative purposes. For example, blocks within the flow diagram can be further divided, combined or performed in a different order without limiting the scope of the claims.

Depending on the requirements of each particular implementation, the blocks can be performed within any combination of the client device 150, display device 140, the input device 170, the streaming environment 110 and the platform server 120.

Referring to FIG. 5, which illustrates the operation of an exemplary sleep timer according to aspects of the present invention, at Block 510, a sleep timer is initiated to correspond with shutting off the client device 150 and/or the display device 140. In one embodiment, shutting off the client device 150 and/or the display device 140 prevents content from being viewed or heard by the user.

At Block 520, relevant aspects of the hardware environment are detected. In one embodiment, in addition to the client device 150 and display device 140, other content sources such as DVD players and CD players may also be detected. Further, peripheral devices such as audio amplifiers and powered sub-woofers may also be detected. Hardware detection may be performed depending on the requirements of each particular implementation and the connectivity/control characteristics and capabilities of each particular hardware environment.

For example, in implementations in which devices are connected via the HDMI interface, devices having Consumer Electronics Control (GEC, or HDMI-CEC) capability may be detected, monitored and controlled by the client device 150 or other suitable device similarly acting as a device controller. In general, the CEC protocol enables control of audio/video (AV) devices that are connected via HDMI. Electrically, the CEC bus is a single-wire bus that is shared between all HDMI-connected devices, thus any HDMI-CEC message can be received by all connected devices. Each device then claims one or more logical addresses on which it receives HDMI-CEC-related commands.

In the context of aspects of the present invention according to certain exemplary embodiments, HDMI-CEC commands may be used to detect, monitor, and control one or more audiovisual devices when a timer reaches an action-execution point. For example, the client device 150 may transmit HDMI-CEC commands to poll or detect the identity, status, and/or communication/control capabilities of devices coupled to the client device 150 via HDMI. Depending on the requirements of each particular implementation and the capabilities and communication protocols associated with each such coupled device, the client device 150 may also transmit HDMI-CEC commands to determine the status of such coupled devices, to adjust their sound volume up and/or down, to dim and/or brighten their displays, to switch them off and/or on, and/or to cause them to transition into an active mode or a stand-by mode.

In other embodiments, client device 150 controls audiovisual devices within its relevant environment (such as, without limitation, DVD players, CD players, television tuners, cable/satellite set top boxes, DVRs (Digital Video Recorders), content streaming devices, television displays, computer monitors, display projectors, audio amplifiers, and/or speakers) via infrared (IR), radio frequency (RF), direct electronic and or optical connection, or other suitable communication and control interfaces. Such embodiments require knowledge of the appropriate control codes/commands and interfaces for each relevant device, according to techniques that are well known to skilled artisans.

Referring back to FIG. 5, at Block 530, a time period corresponding to activating the action-execution phase of the sleep timer is detected. For example, when the action-execution phase of the sleep timer is initiated, then audio and visual content corresponding to the client device 150 and the display device 140 may be terminated and shut off in accordance with various techniques as described herein.

At Block 540, active services in the relevant environment are detected. In one embodiment, active services correspond with the content sources being utilized and the devices utilized to deliver the content. Content sources include, without limitation, the client device 150 for streaming content, DVD players, CD players, television tuners, cable/satellite set top boxes, and DVRs. Active service detection may be performed depending on the requirements of each particular implementation and the connectivity/control characteristics and capabilities of each particular relevant active service.

At Block 550, if the time period expires and the sleep timer is activated, then in one embodiment a ramp-down in active services is employed in Block 560. In one embodiment, the ramp-down in services is implemented as a gradual decrease in audio volume over a period of time until there is no audio signal that is detectable by a user. In another embodiment, the ramp-down in services is a gradual decrease in screen brightness associated with the display device 140 until there is no visual signal that is detectable by a user. For example, the display device 140 starts by displaying content at full brightness, then the display brightness is gradually dimmed until the display device 140 turns to a black screen which is essentially fully dimmed. In another embodiment, the ramp-down in services comprises both a gradual decrease in audio volume over a period of time until there is no audio signal that is detectable by a user, and a gradual decrease in screen brightness associated with the display device 140. Depending on the requirements of each particular implementation the above-listed ramp-down processes may be effected using the appropriate HDMI-CEC commands and/or any of the alternative control mechanisms that were described earlier in connection with Block 520.

In certain embodiments, once initiated, the ramp-down processes described above are effected over a predetermined period of time (e.g., 15 or 30 seconds). Moreover, in certain embodiments, a visual overlay message may be displayed on the screen of the display device 140 during the ramp-down time (e.g., "Shutting down in 15 seconds"), and this overlay message may change textually and/or graphically during the ramp-down time to indicate the impending completion of the ramp-down process (e.g., "Shutting down in 14 seconds," "Shutting down in 13 seconds," . . . "Shutting down in 1 second"). If desired in particular implementations, if a user interacts with the client/controller device 150 directly or indirectly during the ramp-down time (e.g., by pressing a key associated with input device 170 during the ramp-down time), the client/controller device 150 may interpret such interaction as an indication that the ramp-down process should be aborted, suspended, or restarted. For example, such interaction may indicate that a user has not fallen asleep as originally intended, or otherwise wishes to continue the audiovisual presentation at the originally specified action-execution point in time instead of terminating it then. A variety of implementations of such ramp-down process interruption may be effected, depending on the requirements of each particular implementation. For example, upon detection of said user interaction with the client/controller device 150 during the ramp-down process, the client/controller device 150 may issue commands to the relevant coupled audiovisual devices to gradually or abruptly return the sound volume and/or display screen brightness settings to their original levels before the commencement of the ramp-down process.

FIG. 6 illustrates exemplary methods for providing sleep timer choices through the client device 150 according to aspects of the present invention. At Block 610, a sleep timer is initiated. In one embodiment, the sleep timer is initiated through an input device 170.

At Block 620, choices for selection of time durations are displayed through the display device 140. In one embodiment, the time duration is dependent on the current time of day. For example, if the current time is 9:47 pm, then the offered time durations can include 13 minutes to produce a 10 pm shutoff or 43 minutes to produce a 10:30 pm shutoff. In one embodiment, the time duration can be displayed or the actual time for the shutoff can be displayed through the display device 140.

In another embodiment, the time duration is dependent on the source material. For example, if the source material is broadcast television, then selecting a time duration based on the top of the hour or the bottom of the hour may be utilized because programming on broadcast television is segmented based on the top and bottom of each hour. If the source material is from streaming content with different segments based on the length of the content, then the time duration may be matched with the corresponding streaming content duration. In another example, if the source content is a DVD which is divided into different chapters or segments, then the time duration may be matched with the corresponding chapters associated with the specific DVD content.

In one embodiment, the time duration for shutoff (such as how many minutes are left on the timer) may be displayed for selection. In another embodiment, the actual time of day that the shutoff occurs may be displayed for selection. In yet another embodiment, a combination of time duration and actual time of day for the shutoff may both be displayed for selection. At Block 630, the selection of the time duration is detected.

As discussed earlier, embodiments of the present invention relate to a computer storage product with a computer readable storage medium having computer code thereon for performing various computer-implemented operations. The media and computer code may be those specially designed and constructed for the purposes of implementing aspects of the present invention, or they may be of the kind well known and available to those having skill in the computer arts. Examples of computer code include machine code, such as produced by a compiler, and files containing higher-level code that are executed by a computer using an interpreter. For example, as discussed earlier, embodiments of the invention may be implemented using JAVA®, C++, or other object-oriented programming languages and development tools. Other embodiments of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated.

What is claimed is:

1. A method for effecting gradual timer-based deactivation of a controllable audiovisual output device, comprising:
   detecting at a controller device a connectivity and a capability of the controllable audiovisual output device;
   initiating a timer at the controller device;
   calculating at the controller device a period of time for deactivation based at least in part on a time segment of a source material and a current time of the timer, wherein the period of time for deactivation is greater than one second; and
   in response to the calculating, transmitting a command based at least in part on the connectivity and the capability of the controllable audiovisual output device to the controllable audiovisual output device to decrease a sound volume or a display brightness generated by the controllable audiovisual output device over the period of time for deactivation.

2. The method of claim 1, further comprising:
   detecting user interaction with the controller device during the period of time for deactivation; and
   in response to the detecting, transmitting a command from the controller device to the controllable audiovisual output device to set the sound volume or display brightness of the controllable audiovisual output device to a sound volume level or a display brightness level that were set before the initiating the timer.

3. The method of claim 1, further comprising:
   displaying the period of time for deactivation for user selection on the controllable audiovisual output device.

4. The method of claim 1, further comprising:
   detecting at the controller device the time segment of the source material.

5. The method of claim 1, wherein the controllable audiovisual output device comprises a television set.

6. The method of claim 5, wherein the controller device and the television set communicate via high-definition multimedia interface consumer electronics control (HDMI-CEC) commands.

7. The method of claim 5, wherein the controller device and the television set communicate via a wireless infrared (IR) interface or wireless radio frequency (RF) interface.

8. The method of claim 1, wherein the calculating comprises calculating at the controller device the period of time for deactivation based at least in part on a power criterion of the controllable audiovisual output device.

9. The method of claim 1, further comprising:
   in response to the calculating, transmitting a second command to a second controllable audiovisual output device to decrease a sound volume or a display brightness generated by the second controllable audiovisual output device over the period of time for deactivation.

10. The method of claim 1, wherein the time segment of the source material comprises a chapter of a digital versatile disc (DVD).

11. The method of claim 1, wherein the time segment of the source material is based at least in part on a length of the source material.

12. A system, comprising:
    a processor configured to:
    detect a connectivity and a capability of a controllable audiovisual output device;
    initiate a timer;
    calculate a period of time for deactivation based at least in part on a time segment of a source material and a current time of the timer, wherein the period of time for deactivation is greater than one second; and
    in response to the calculating, transmit a command based at least in part on the connectivity and the capability of the controllable audiovisual output device to the controllable audiovisual output device to decrease a sound volume or a display brightness generated by the controllable audiovisual output device over the period of time for deactivation.

13. The system of claim 12, wherein the processor is further configured to:
    detect user interaction with the controller device during the period of time for deactivation; and
    in response to the detecting, transmit a command from the controller device to the controllable audiovisual output device to set the sound volume or display brightness of the controllable audiovisual output device to a sound volume level or a display brightness level that were set before the initiating the timer.

14. The system of claim 12, wherein the processor is further configured to:
    detect at the controller device the time segment of the source material.

15. The system of claim 12, wherein the time segment of the source material comprises a chapter of a digital versatile disc (DVD).

16. The system of claim 12, wherein the time segment of the source material is based at least in part on a length of the source material.

17. A non-transitory computer-readable storage medium having instructions stored thereon that, when executed by at least one computing device, causes the at least one computing device to perform operations comprising:
    detecting at a controller device a connectivity and a capability of a controllable audiovisual output device;
    initiating a timer at the controller device;
    calculating at the controller device a period of time for deactivation based at least in part on a time segment of a source material and a current time of the timer, wherein the period of time for deactivation is greater than one second; and
    in response to the calculating, transmitting a command based at least in part on the connectivity and the capability of the controllable audiovisual output device to the controllable audiovisual output device to decrease a sound volume or a display brightness generated by the controllable audiovisual output device over the period of time for deactivation.

18. The non-transitory computer-readable storage medium of claim 17, the operations further comprising:
  detecting user interaction with the controller device during the period of time for deactivation; and
  in response to the detecting, transmitting a command from the controller device to the controllable audiovisual output device to set the sound volume or display brightness of the controllable audiovisual output device to a sound volume level or display brightness level that were set before the initiating the timer.

19. The non-transitory computer-readable storage medium of claim 17, the operations further comprising:
  detecting at the controller device the time segment of the source material.

20. The non-transitory computer-readable storage medium of claim 17, wherein the time segment of the source material comprises a chapter of a digital versatile disc (DVD).

21. The non-transitory computer-readable storage medium of claim 17, wherein the time segment of the source material is based at least in part on a length of the source material.

* * * * *